United States Patent

Wik

[11] 3,808,660
[45] May 7, 1974

[54] METHOD FOR CORRECTING ROTATIONAL NON-UNIFORMITY OF A PNEUMATIC TIRE AND WHEEL ASSEMBLY

[75] Inventor: Thomas R. Wik, Middleburg Heights, Ohio

[73] Assignee: The B. F. Goodrich Company, New York, N.Y.

[22] Filed: Sept. 1, 1972

[21] Appl. No.: 285,576

[52] U.S. Cl............. 29/159 R, 29/159.01, 29/404, 29/407, 74/573, 301/5 B, 301/9 DN
[51] Int. Cl....... B21d 53/26, B21k 1/28, B21k 1/42
[58] Field of Search............ 29/159 R, 159.01, 404, 29/156.8 P, 407, 159.1; 73/455, 457; 74/573; 301/1, 5 B, 9 DN; 33/180 R

[56] References Cited
UNITED STATES PATENTS

| | | | |
|---|---|---|---|
| 1,860,216 | 5/1932 | Ash | 301/5 B |
| 2,708,119 | 5/1955 | Best | 301/1 X |
| 3,046,058 | 7/1962 | Hamer | 301/5 B |
| 3,207,557 | 9/1965 | Hunter | 29/406 X |

FOREIGN PATENTS OR APPLICATIONS
577,826  6/1946  Great Britain.................. 29/156.8 P OTHER PUBLICATIONS
"Mechanical Vibrations," Second Ed., Austin Church, John Wiley and Sons, Inc., 1964, pp. 128–136.

Primary Examiner—Charles W. Lanham
Assistant Examiner—Victor A. DiPalma
Attorney, Agent, or Firm—W. A. Shira, Jr.; J. Januszkiewicz

[57] ABSTRACT

A method to reduce rotational non-uniformity of a pneumatic tire and wheel assembly, produced by radial force variation, comprising determining the first harmonic of the variation in radial force of the assembly while rotating about its axis, providing the wheel with a central opening eccentric with respect to the said axis of rotation, the amount of the eccentricity of the opening and its orientation being selected and disposed so as to counteract and oppose the first harmonic of the variation in radial force of the assembly, and employing the axis of said opening as the axis for rotation of the assembly when in use.

8 Claims, 3 Drawing Figures

PATENTED MAY 7 1974  3,808,660

METHOD FOR CORRECTING ROTATIONAL NON-UNIFORMITY OF A PNEUMATIC TIRE AND WHEEL ASSEMBLY

BACKGROUND OF THE INVENTION

The ride characteristics of a vehicle equipped with wheels on which pneumatic tires are mounted are adversely affected by unbalance of the wheel and tire assembly, lack of concentricity of the assembly with the axis of rotation thereof, and circumferential variations in the spring rate of the tire. This problem is particularly acute in wheel and tire assemblies of passenger cars and other high-speed over-the road vehicles.

The increasing demand for tire and wheel assemblies for passenger cars which are substantially free of ride abnormalities has led to the common practice of testing each tire for uniformity by temporarily mounting it on a simulated rim structure, rotating the inflated tire against a load wheel and measuring the amount and location of the variation of radial force exerted by the tire. In the event the variation is excessive, small amounts of the tread rubber may be removed until the variation is within acceptable limits. However, this does not provide for any existing non-uniformity of the wheel on which the tire will be mounted. Hence, when the tire is assembled onto an actual vehicle wheel for mounting on a vehicle, the assembly may exhibit excessive non-uniformity due not only to residual radial force variation of the tire but also to lack of concentricity and/or non-uniform weight distribution of the assembly. This may, at times, be at least partially corrected by shifting the tire circumferentially about the wheel so that the non-uniformity of the latter and of the tire are disposed in a substractive rather than additive relationship. However, this is a time consuming trial-and-error type compensation which is far from satisfactory for general use. Moreover, there may still remain a lack of concentricity of the tire periphery with the axis of rotation and/or a non-uniform weight distribution requiring further corrective measures.

It has, therefore, been desirable to find a way of correcting the non-uniformity of a completely assembled tire and wheel rim which eliminates the removal of portions of the tread and/or the trial-and-error positioning of the tire on the rim with the frequently necessary mounting and dismounting of several tires in an effort to find one having a radial force variation which is compatible with the abnormalities of the wheel.

These conditions, while particularly acute with regard to pneumatic tires for high-speed passenger vehicle service, also are of concern for tires employed on trucks which are frequently operated at speeds equivalent to those of passenger vehicles. As a result standards for the maximum allowable variation in the first harmonic of radial force variation of pneumatic tires have been set at levels causing excessive rejects and reworking of high-volume produced tires with consequent waste of materials and labor. Unfortunately, these standards have not eliminated the ride abnormalities since merely correcting lack of uniformity of the tire does not correct the abnormalities of the wheel on which the tire is ultimately mounted.

SUMMARY OF THE INVENTION

The present invention provides a simple and inexpensive solution to the above-described problems of enabling a pneumatic tire to be assembled to the actual wheel upon which it is to be mounted on a vehicle with the assembly being within acceptable tolerances for ride characteristics without the necessity for excessive labor or rejection of an excessive number of tires. Briefly stated, this is achieved by rotating the wheel and tire assembly while on a uniformity testing machine, measuring and locating the maximum of the first harmonic of the radial force variation of the assembly, and then providing a central opening for the wheel eccentric with respect to the axis of rotation with the amount of eccentricity so selected and positioned that the rotational axis is shifted so that the eccentricity opposes and counteracts the first harmonic of the variation in radial force of the tire and wheel assembly. The assembly is then mounted for use for rotation about the axis of the said opening.

In the event a wheel is available which is known to be substantially free of abnormalities, the invention may be successfully employed by determining the radial force variation of the tire alone, mounting the tire on the wheel and providing the latter with a central opening eccentric relative to its periphery by an amount and location which will correct the tire abnormality.

Any weight unbalance which may result from the eccentricity of the assembly is simply corrected by the conventional application of balance weights.

DETAILED DESCRIPTION

Figure 1:
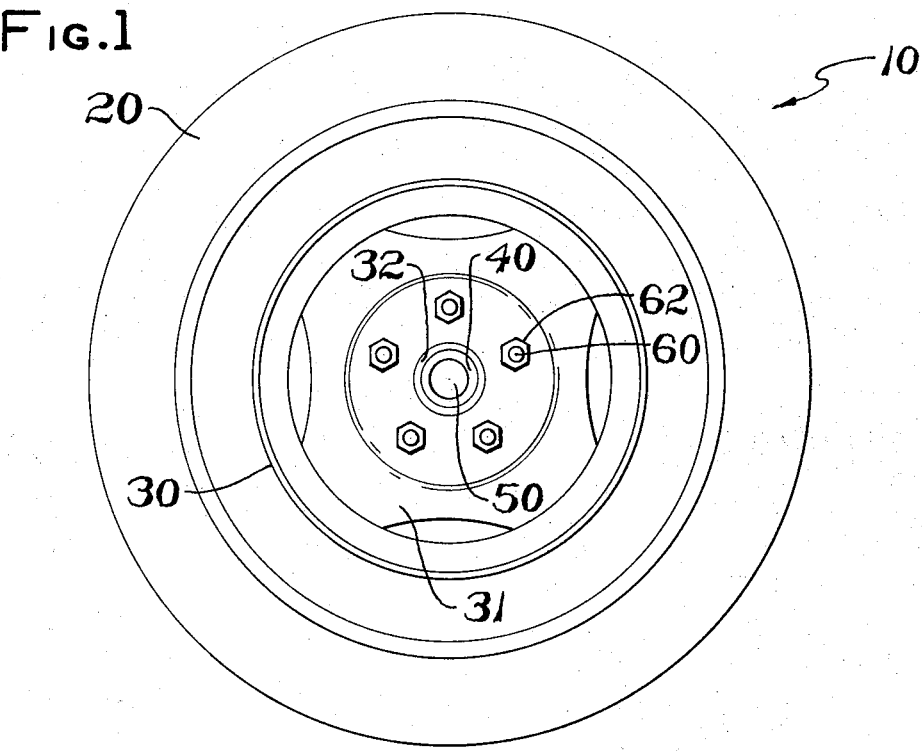
FIG. 1 is a side elevational view of a pneumatic tire mounted on a vehicle wheel and assembled over an axle, on which the assembly is to rotate, after correction in accordance with the invention.
Figure 2:
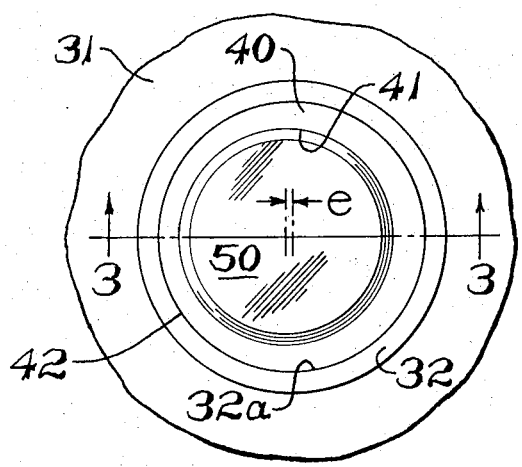
FIG. 2 is an enlarged side elevational view of the central portion of FIG. 1; and, FIG. 3 is a partial section view taken along section indicating lines 3—3 of FIG. 2.

Referring first to FIG. 1, the invention is illustrated as it is applied to an assembly 10 of an inflated pneumatc tire 20 mounted on a conventional disc wheel 30 having a web portion 31, which has a center circular hole with flanged edge 32. The wheel 30 utilized in the practice of the invention, may be any conventional type used for passenger cars or trucks. The illustrated wheel is of the type having a plurality of mounting bolt holes in circular arrangement about the flanged edge 32 of the central opening. However, the invention is not limited to wheels of the type illustrated and may be employed with all conventional types of wheels for pneumatic tires. The illustrated assembly is mounted on a vehicle in the conventional manner with the end of the axle or spindle 50 of the vehicle received in the central opening or hole of the wheel and the threaded studs 60 extending through the bolt holes, the assembly being retained in place by the usual nuts 62.

Figure 3:
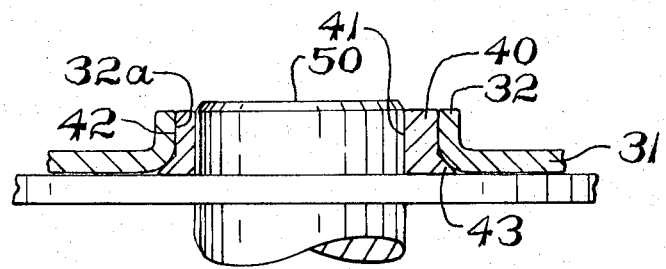

The tire and wheel assembly, prepared in accordance with the present invention, differs from conventional tire and wheel assemblies of similar type by having the axis of the central opening shifted eccentrically relative to the conventional opening by an amount and in the direction which counteracts the first harmonic of the radial force variation of the assembly. In the presently preferred embodiment this is achieved by the wheel having initially a larger than normal central hole or opening in which an annular member or ring 40 is received so that this member is radially intermediate the axle or spindle 50 of the vehicle and the flanged edge 32 of the center opening of the wheel. The ring 40 preferably is of substantially rectangular cross section, as shown in FIG. 3, and has the circular central opening 41 thereof disposed eccentrically to the outer periphery 42 which has a diameter such as to provide a force fit of the member within the inner periphery 32a of the edge flange 32 of the central opening of the wheel. The inner periphery of the ring member 40 removably fits over the end of the vehicle axle or spindle and locates the assembly thereon so that the assembly will rotate about the axis of the opening 41. The holes for the mounting bolts are generally large enough to permit this shift of axis of the assembly but may be enlarged if necessary.

The ring 40 preferably has a tapered flange 43 extending radially outwardly from the outer periphery adjacent one side face thereof and is so positioned that when assembled over the axle, the flange 43 has one axial face thereof registered against the face of the wheel web. The ring flange 43 thus retains the ring securely in the wheel when the latter is bolted onto the axle or spindle 50.

In practicing the presently preferred form of the method of the invention, the tire is first mounted on the rim of the wheel 30 with which it is to be used, the tire is inflated, and the assembly is then rotated on a tire uniformity machine about the axis of the central opening. The uniformity machine may be any of those commercially available which are of the type in which a load wheel is run against the outer periphery of the rotating tire, the stresses upon the load wheel resulting from variations in radial force exerted thereon by the wheel and the tire assembly detected, and the peripheral location and magnitude of the maximum of first harmonic of variation in radial force on the tire periphery indicated. Upon completion of rotation and determination of the magnitude and location of the first harmonic variation of radial force of the assembly, the latter is removed from the uniformity testing machine. A ring 40 of appropriate eccentricity, as hereinafter explained, is placed in the center hole of the wheel. This ring is located with the thinnest portion of the wall of the ring radially coincident with the location of the maximum of the first harmonic of radial force variation of the tire and wheel assembly. Stated in other words, a radial line through the geometric axis of the assembly passes sequentially through the thinnest wall section of ring 40 and the peripheral location of the portion of the tire causing the maximum of the first harmonic of radial force variation.

Preferably, the wheel 30, although otherwise conventional, is made with a larger than normal central opening to accommodate the annular member or ring 40. However, the invention may be practiced with conventional wheels by first enlarging the central opening sufficiently to accommodate the ring. In the preferred practice of the invention for a typical wheel for a passenger vehicle, the central opening has a diameter which is at least 0.2 inch greater than the diameter of the hub for the axle or spindle in which it is mounted with the inner diameter of the ring member 40 only sufficiently larger than the hub diameter to permit easy wheel mounting and demounting.

The amount of eccentricity of the ring 40 necessary to oppose and counteract the radial force may be determined empirically by providing a plurality of rings of graduated eccentricity, sequentially placing each ring in the wheel, testing for radial force variation and thus determining the amount of change in that characteristic for each ring. The data thus compiled can be latter used for selecting an appropriate ring to correct a determined amount of radial force variation.

The eccentricity for a particular tire and wheel assembly may also be determined by the equation $$e = A_1/K$$

where $e$ is the eccentricity of the ring in inches, $A_1$ is the maximum amplitude, in units of pounds force, of the first harmonic of radial force variation of the assembly, and $K$ is the radial deflection rate, or spring rate, in units of pounds per inch of the inflated tire. It will readily be understood by those skilled in the art that the spring rate $K$ of the tire should be measured, for a given size tire, at the same inflation pressure and during rotation at the same speed as employed for measurement of the first harmonic of radial force variation. The spring rate need not be separately determined for each assembly since sufficient accuracy is obtained by employing the same spring rate for all tires of like size and construction when inflated to the pressure at which the spring rate was determined.

Without limitation thereto, it may be mentioned by way of specific example that a tire and wheel assembly exhibiting a peak-to-peak first harmonic radial force variation of 67.4 pounds was reduced to a variation of 10.6 pounds by a ring having an eccentricity, $e$, of 0.025 inch. Similarly, an assembly exhibiting a peak-to-peak first harmonic radial force variation of 110.6 pounds was reduced to a variation of 11.6 pounds by a ring having an eccentricity of 0.042 inch. In general, a substantially lesser eccentricity will prove necessary since tires usually acceptable for original equipment on passenger vehicles exhibit a much lesser maximum of first harmonic radial force variation than those of the examples given. Typically, an eccentricity of 0.003 to 0.010 inch of the ring member 40 would provide the desired improvement.

The provision of the ring member 40 as described may introduce some static and/or dynamic unbalance in the tire and wheel assembly. This, together with any otherwise present weight unbalance, can be corrected by one of the customary tests for unbalance and application of balance weights to the assembly.

It will now be apparent that the presently preferred embodient of the invention provides a unique and simplified method of correcting the undesired variation in the first harmonic of radial force variation of a rotating tire and wheel assembly by the simple expedient of determining the location and amount thereof and press-fitting an eccentric ring into the center hole of the rim with the extent and location of the eccentricity so disposed as to oppose and counteract the undesired variation in radial force. However, invention is not limited to providing the required eccentricity by an inserted ring member since other means may be employed.

Moreover, although the invention has been described as it is applied to a tire and wheel assembly in which both the tire and wheel possess abnormalities and, hence, both are simultaneously corrected, the invention can be successfully employed by determining the location and amount of the radial force variation for the tire alone when a wheel is available that is known to be substantially free of abnormalities. In that case, after mounting the tire upon the wheel, the wheel is provided with a central opening the eccentricity of which is dependent only upon the abnormalities of the tire with the eccentricity provided and located as heretofore described. The assembly may then be tested for weight unbalance and correction therefor effected by the application of balance weights in a conventional manner.

Variations of the invention, as herein specifically illustrated and described, will be apparent to those having ordinary skill in the art and, hence, the invention is not to be construed as limited other than as defined in the following claims.

I claim:

1. The method of improving the rotational characteristics of a pneumatic tire comprising the steps of:
   a. determining the amount and location of the maximum of the first harmonic of radial force variation of the tire;
   b. mounting the tire on a wheel; and,
   c. providing the wheel with a central opening having an inner circular periphery of diameter that permits mounting upon a vehicle axle, the said inner circular periphery being eccentric by an amount determined by the amount of the said maximum of the first harmonic of force variation of the tire and the eccentricity of the opening being so located that the axis of rotation of the tire and wheel is shifted in the radial direction corresponding to the location of the said maximum of radial force variation.

2. The method as defined in claim 1 and further comprising the steps of:
   a. testing the assembled tire and wheel for weight unbalance; and,
   b. correcting the unbalance.

3. The method as defined in claim 1 wherein the eccentricity of the said opening is determined in accordance with the formula $e = A_1/K$, where $e$ is the eccentricity, $A_1$ is the maximum amplitude of the first harmonic of the radial force variation of the tire, and $K$ is the radial deflection rate of the inflated tire.

4. The method of reducing the first harmonic of variation in radial force exhibited at the periphery of a rotating pneumatic tire and wheel assembly comprising the steps of:
   a. mounting the tire on a wheel having a predetermined axis of rotation;
   b. determining the magnitude and location of the maximum of the first harmonic of the variation in radial force at the periphery of the tire while rotating said assembly about the said axis; and,
   c. shifting the said axis of rotation of the assembly eccentrically relative to the first-mentioned axis with the amount of the eccentricity and the location thereof so selected that rotation of said assembly about the shifted axis counteracts and opposes said first harmonic of radial force variation.

5. The method defined in claim 4, wherein the eccentricity of the shifted axis is expressed by the formula $e = A_1/K$, where $e$ is the eccentricity, $A_1$ is the amplitude of the said maximum of the first harmonic of radial force variation, and $K$ is the radial deflection rate of the inflated tire.

6. The method of improving the rotational characteristics of an assembly of a pneumatic tire upon a wheel having a circular central opening comprising the steps of:
   a. determining the amount and location of the maximum of the first harmonic of radial force variation of the assembly while the latter is rotated about the axis of the said central opening;
   b. selecting an annular member having a circular outer periphery of diametr such as to fit in the said central opening of the wheel and an inner circular periphery of diameter that permits mounting upon a vehicle axle, the said inner circular periphery being eccentric with respect to the outer periphery by an amount determined by the amount of the said maximum of the first harmonic of radial force variation of the tire; and,
   c. positioning the said annular member in the said central opening of the wheel with the eccentricity of the member so located that the axis of rotation of the assembly is shifted in the radial direction corresponding to the location of the said maximum of radial force variation.

7. The method as defined in claim 6 wherein the eccentricity of the inner periphery of the annular member is determined in accordance with the formula $e = A_1/K$ where $e$ is the eccentricity, $A_1$ is the maximum amplitude of the first harmonic of the radial force variation, and $K$ is the radial deflection rate of the inflated tire.

8. The method defined in claim 6 further comprising:
   a. testing the assembly for weight unbalance after inserting of said annular member; and,
   b. correcting the unbalance.

* * * * *